United States Patent [19]

Diem et al.

[11] Patent Number: 6,001,666
[45] Date of Patent: Dec. 14, 1999

[54] MANUFACTURING PROCESS OF STRAIN GAUGE SENSOR USING THE PIEZORESISTIVE EFFECT

[75] Inventors: Bernard Diem, Echirolles; Sylvie Viollet-Bosson, VIF; Patricia Touret, Echirolles, all of France

[73] Assignee: Commissariat a l'Energie Atomique, Paris, France

[21] Appl. No.: 08/824,084

[22] Filed: Mar. 24, 1997

[30] Foreign Application Priority Data

Mar. 28, 1996 [FR] France .................................. 96 03885

[51] Int. Cl.⁶ .................................................. H01L 21/00
[52] U.S. Cl. .............................. 438/52; 438/50; 438/53; 438/455; 438/456; 438/753; 438/733; 438/973; 148/DIG. 159; 257/417; 257/419; 257/420
[58] Field of Search .................................. 438/50, 52, 53, 438/455, 456, 753, 733, 973, FOR 121, FOR 412, FOR 432, FOR 388; 148/DIG. 159; 257/417, 419, 420

[56] References Cited

U.S. PATENT DOCUMENTS

| Re. 31,459 | 12/1983 | Block ......................................... 338/47 |
| 3,620,084 | 11/1971 | Slykhouse ................................ 73/398 |
| 3,893,228 | 7/1975 | George et al. ............................ 29/580 |
| 4,332,000 | 5/1982 | Peterson ................................... 361/283 |
| 4,456,901 | 6/1984 | Kurtz et al. ............................... 338/4 |
| 4,510,671 | 4/1985 | Kurtz et al. ............................... 29/571 |
| 4,739,298 | 4/1988 | Kurtz et al. ............................... 338/2 |
| 4,975,390 | 12/1990 | Bruel ........................................ 437/24 |
| 5,632,854 | 5/1997 | Mirza et al. .............................. 438/53 |

FOREIGN PATENT DOCUMENTS

| 0533551 | 3/1993 | European Pat. Off. . |
| 2681472 | 3/1993 | France . |
| 2201464 | 4/1997 | France . |
| 9516192 | 6/1995 | WIPO . |

OTHER PUBLICATIONS

Peterson et al., "Ultra–stable, High–temperature Pressure Sensors Using Silicon Fusion Bonding"; 1990; pp. 96–101; Sensors and Actuators, A21–A23.

Wallis et al; "Field Assisted Glass–Metal Sealing"; Sep. 1969; pp. 3946–3949; Journal of Applied Physics, vol. 40, No. 10 .

Kanda; "A Graphical Representation of the Piezoresistance Coefficients in Silicon"; Jan. 1982; pp. 64–70; IEEE Transactions on Electron Devices, vol. ED–29, No. 1.

Bean; "Anisotropic Etching of Silicon"; Oct. 1978; pp. 1185–1192; IEEE Transactions on Electron Devices. vol. 25, No. 10.

Shimbo et al; "Silicon–to–silicon direct bonding method"; Oct. 1986; pp. 2987–2989; Journal of Applied Physics vol. 60, No. 8.

Kalvesten et al; "A small–size silicon microphone for measurements in turbulent gas flows"; Nov. 1994; pp. 103–108; Sensors and Actuators. No. 2.

*Primary Examiner*—Wael Fahmy
*Assistant Examiner*—Long Pham
*Attorney, Agent, or Firm*—Hayes, Soloway, Hennessey, Grossman & hage PC

[57] ABSTRACT

This invention relates to the manufacture of a strain gauge sensor using the piezoresistive effect, comprising a structure (1) made of a monocrystalline material acting as support to at least one strain gauge (2) made of a semiconducting material with a freely chosen doping type. The strain gauge (2) is an element made along a crystallographic plane determined to improve its piezoresistivity coefficient. The structure (1) is a structure etched along a crystallographic plane determined to improve its etching. The strain gauge (2) is fixed to the structure (1) by bonding means capable of obtaining said sensor.

7 Claims, 7 Drawing Sheets

MANUFACTURING PROCESS OF STRAIN GAUGE SENSOR USING THE PIEZORESISTIVE EFFECT

BACKGROUND OF THE INVENTION

1. Field of the Invention

This invention relates to a strain gauge sensor using the piezoresistive effect. It also concerns the process for manufacturing such a sensor.

2. Description of the Invention

A strain gauge is an element of a mechanical magnitude sensor which is deformed under the action of the mechanical phenomenon whose magnitude is to be measured, and this deformation causes a variation of its electrical resistance. This variation in the electrical resistance is used to deduce the value of the mechanical strain exerted. Semiconducting gauges based on the piezoresistive effect. have replaced metallic gauges due to their significantly better sensitivity.

At the present time, micro-machined silicon sensors are more and more frequently used due to their low cost and their high performances. The most developed of various types of sensors, since they are the best known, are undoubtedly those that use detection based on single crystal silicon strain gauges. They can be classified in two categories:

- a first category includes sensors whose strain gauges are isolated from the substrate by an inverse pn junction and are made by diffusion of implantation of ions in the semiconducting substrate,
- a second category includes sensors whose strain gauge is isolated from the semiconducting substrate on which it is made, by a dielectric layer. The substrate used may be an SOI (silicon on isolator) substrate of the SIMOX, SDB or ZMR type, the dielectric layer being made of silica.

U.S. Pat. Nos. 456,901, 4,739,298 and U.S. Pat. No. 4,510,671 describe embodiments of sensors in this second category. Document U.S. Pat. No. 4,739,298 describes a pressure sensor whose membrane and support frame are made of silicon. The membrane is covered by a thick layer of glass that is used for anodic gluing. The sensor is made by a set of plates. The strain gauge is made of highly p doped silicon, this choice being related to the use of a selective chemical etching step.

The advantage of sensors in the first category is their low cost, and the advantage of sensors in the second category is that they have high performance and can be used at a higher temperature. In each case, the crystallographic orientation of the strain gauge is necessarily identical to that of the substrate.

The authors of this invention concluded that these sensors, although very efficient, are not made in an optimum manner. The piezoresistance coefficient varies as a function of the orientation of the substrate plane, depending on the direction of this plane and on the type of doping of the semiconducting material. Furthermore, anisotropic chemical machining of the substrate to make the mechanical structure of the sensor also depends on the crystallographic orientation of the sensor. Therefore, there is a close interdependence between the support element and the sensor detection element. For a given crystallographic orientation of the substrate, it is possible to obtain a particular geometry for the machined mechanical structure and a particular direction for the sensitive axis of the strain gauge on this structure, consequently limiting optimization of the final component.

A reference on the behavior and the dependence of the piezoresistivity of silicon on its crystalline orientation is given in the article written by Y. KANDA entitled "A Graphical Representation of the Piezoresistance Coefficients in Silicon" published in the IEEE Transactions on Electron Devices, Vol ED-29, No. 1, January 1982. Anisotropic chemical etching of silicon is described in the article "Anisotropic Etching of Silicon" by K. E. BEAN published in IEEE Transactions on Electron Devices, Vol. ED-25, No. 10, October 1978.

BRIEF SUMMARY OF THE INVENTION

In order to overcome the lack of optimization of components when using known methods, this invention proposes a sensor in which the mechanical structure can be chosen independently of the strain gauge. This improves the efficiency of the sensor. This efficiency may be optimized by choosing the crystallographic orientations for machining the strain gauge and the structure on which it is supported.

Therefore, the purpose of the invention is a strain gauge sensor using the piezoresistive effect, comprising a structure made of a mono-crystalline material acting as a support for at least one strain gauge made of a semiconducting material with a freely chosen doping type, characterized in that the strain gauge is an element made in a crystallographic plane determined to improve its piezoresistivty coefficient, the structure is an etched element on a crystallographic plane determined to improve its etching, the strain gauge being fixed on a structure by bonding means capable of obtaining the said sensor.

The structure may be made of a semiconducting material or quartz.

Bonding means may consist of an adhesive substance. If it is required to avoid using an adhesive substance, the strain gauge may be bonded to its support firstly by preparing the surfaces to be put into contact, followed by a thermal and/or electrostatic treatment to improve interatomic bonds between the corresponding surfaces of the support and the gauge.

It is useful if the strain gauge and/or its support can be covered with a dielectric layer, thus insulating the semiconducting parts in the two elements from each other. Sensors thus made will have improved signal/noise performances and can be used at high temperature.

The strain gauge and its support are advantageously made of silicon. In this case, if a dielectric layer is used, it will be made of silicon oxide $SiO_2$.

Another purpose of the invention is a process for making at least one semiconducting strain gauge sensor using the piezoresistive effect, the sensor comprising a structure made of a semiconducting material capable of being etched anisotropically to act as a support for a least one strain gauge also made of a semiconducting material, characterized in that it includes the following operations:

- etching of a first substrate of a semiconducting material with a given doping, along a crystallographic plane determined to improve its etching and to make up the said structure,
- manufacture of a strain gauge made of a semiconducting material with a freely chosen type of doping along a crystallographic plane determined to improve its piezoresistivity coefficient,
- operation in which the strain gauge is bonded onto the structure to obtain the said sensor.

According to a preferred alternative embodiment, the gauge is made from a substrate formed from a monocrystalline semiconducting material with a freely chosen type of doping and in which a plane face is chosen as a function of the said crystallographic plane determined for the gauge, the plane surface being subject to ion implantation creating a layer of gaseous micro-bubbles within the volume of substrate and at a depth approximately equal to the depth of ion penetration, delimiting a thin film on the side of the plane surface, the ions being chosen among the ions of rare gases and hydrogen gas, the temperature of the substrate being kept below the temperature at which the gas generated by the implanted ions can escape from the substrate by diffusion, then the structure and the substrate are bonded together, the plane face of the substrate being adjacent to the part of the structure acting as a support for the strain gauge, the substrate is then subjected to a temperature high enough to create a separation between the thin film and the rest of the substrate due to a crystalline rearrangement effect and the pressure of the micro-bubbles, and finally the thin film is etched to give it the required shape.

BRIEF DESCRIPTION OF THE INVENTION

The invention will better be understood and other details and special features will become clear from reading the following description given as a nonrestrictive example, accompanied by the drawings in the appendix, including:

FIGS. 1A, 1B, 2A, 2B, 3A, 3B, 4 and 5 show structures made of monocrystalline semiconducting material capable of acting as a support for a strain gauge according to this invention, FIGS. 6A and 6B are sectional views of the top and side of a pressure sensor for a hydrophone, according to this invention, FIGS. 7 to 21 illustrate a process for making the pressure sensor shown in FIGS. 6A and 6B, according to this invention.

DETAILED DESCRIPTION OF THE INVENTION

In the rest of the description, the strain gauge will be made of a thin film of a semiconducting material composed of one or more layers with a uniform and controlled thickness, which comes into intimate contact with a support machined as a function of its specific characteristics. The nature of the thin film may be different from the nature of the support and may be freely oriented on it. The strain gauge may advantageously be fixed to the support by putting the thin film into intimate contact on its support in accordance with the process described in document FR-A-2 681 472. However, other methods of bonding the strain gauge (or strain gauges if applicable) onto its support are applicable within the framework of this invention.

The process for manufacturing a semiconducting thin film and for bonding it to its support as described in document FR-A-2 681 472 consists of applying the following steps to a platelet of the required semiconducting material with Et plane surface:

a first implantation step by bombarding the plane surface of the said material with ions creating a layer of gaseous micro-bubbles within -he volume of the platelet at a depth similar to the penetration depth of the said ions, these micro-bubbles separating the platelet into a lower region forming the bulk of the substrate and an upper region forming the thin film, the ions being chosen among ions of rare gases or hydrogen gas, and the temperature of the platelet being kept below the temperature at which the gas generated by the implanted ions can escape from the semiconductor by diffusion;

a second step putting the plane surface of the platelet into intimate contact with a support composed of at least one layer of rigid material. For example, this intimate contact can be created using an adhesive substance by the effect of a prior surface preparation and heat and/or electrostatic treatment to improve interatomic bonds between the support and the platelet;

a third heat treatment step of the platelet support assembly at a temperature exceeding the temperature at which the implantation was done and sufficient to create a separation between the thin film and the substrate mass, due to the effect of crystalline rearrangement in the platelet and the pressure of the micro-bubbles.

After all these steps, a support is obtained which may be composed for example of a silicon substrate with a particular orientation and doping that depend on the future application, and a thin film composed of another material which may also be monocrystalline silicon but possibly with a different crystalline orientation, this film having been glued using any method along a judicious direction to optimize its use. Furthermore, this film may be separated from the support by a layer of insulating material (for example $SiO_2$) present on the film or on the support or on both.

If intimate contact within the thin film and the support is made by interatomic bond, an additional heat treatment step at high temperature (for example 2 hours at 1100° C.) is necessary to provide a final bond. This technique is commonly called silicon direct bonding (SDB) and is described in many publications, including "Silicon-to-silicon direct bonding method" M. Shimbo et al., J. Appl. Phys., vol. 60 (8), Oct. 15, 1986 and "Ultra-stable, High-temperature Pressure Sensors Using Silicon Fusion Bonding", K. Petersen et al., Sensors and Actuators, A21–A23 (1990) 96–101.

Anisotropic chemical etching of monocrystalline silicon, frequently used nowadays for making microstructures, is the result of a difference in the attack speed on crystallographic planes. In an anisotropic etching solution such as KOH, EDP, TMAH, etc., this velocity generally decreases in the order (100) >(110) >(111). These cavities or structures made of silicon will then be delimited by edges that represent the fastest and slowest attack planes of the crystal. It is therefore very useful to be able to freely choose the crystalline orientation of the substrate depending of the final geometric shape required for the structure.

For example, FIGS. 1A, 1B, 2A, 2B, 3A, 4 and show different possible supports within the framework of this invention.

A beam 11 shown in FIG. 1A has been etched in a substrate 12 with indices (100) using an etching mask oriented along <110>. In this case, if the beam is built-in at one of its ends, the preferred deformation will take place along the z direction as shown in FIG. 1B, which gives a better view of the symmetric trapezoidal shaped cross-section of beam 11.

In FIG. 2A, a beam 21 was etched in a substrate 22 with indices (100) with an etching mask oriented along <010>. In this case, the preferred axis will be x, but the lateral overetching will be equal to the etched depth.

In FIG. 3A, a beam 31 was etched in a substrate 32 with indices <110> with an etching mask oriented along <111> in this case without any lateral overetching. The sensitive deformation axis of beam 31 is in the same direction as above, but on a substrate 32 with a different orientation.

Figure 1A:
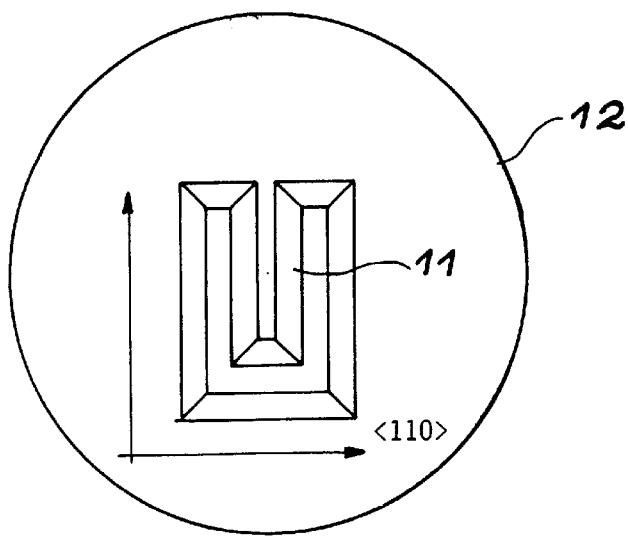
Figure 1B:
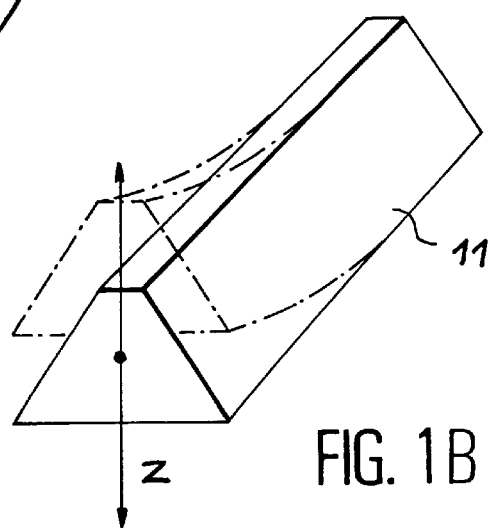
Figure 2A:
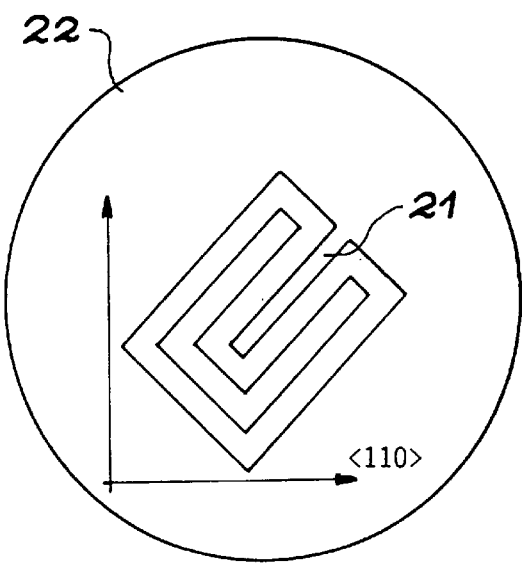
Figure 2B:
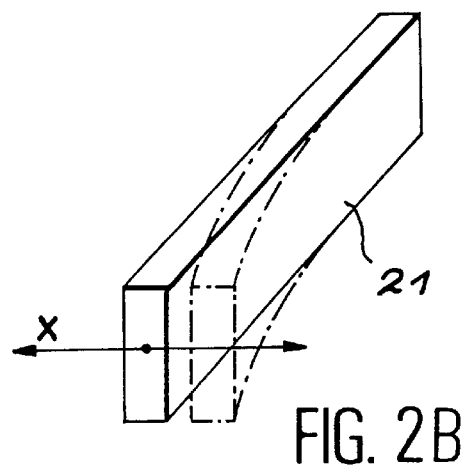
Figure 3A:
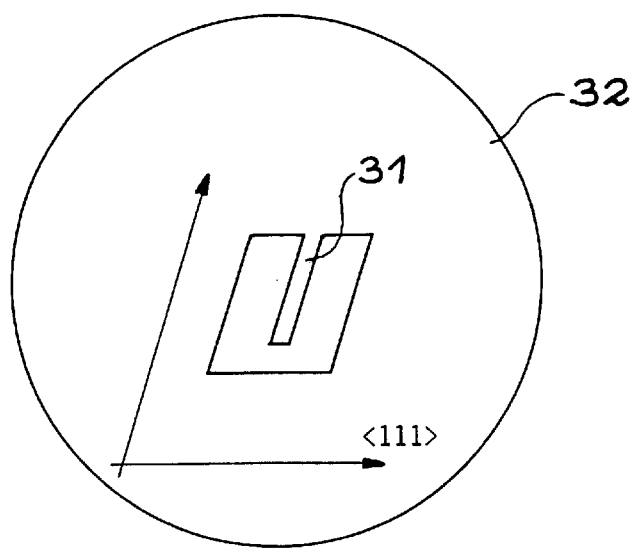
Figure 3B:
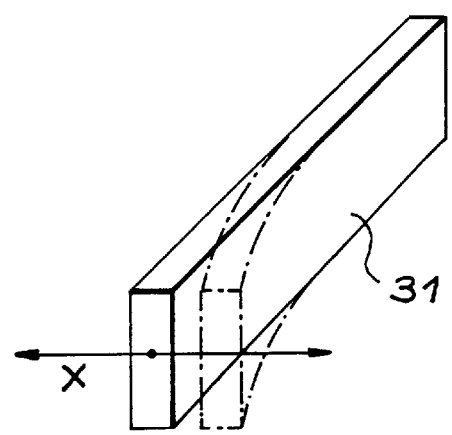
Figure 4:
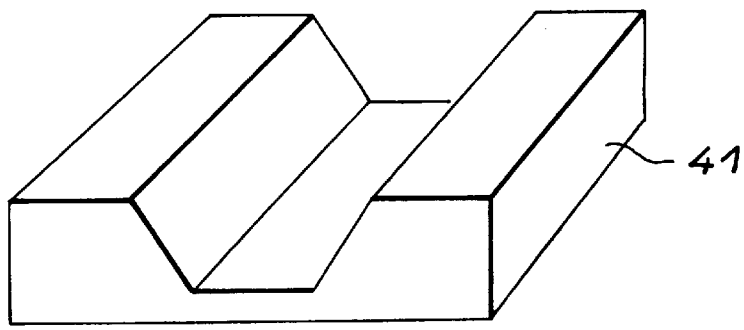
FIG. 4 shows the shape of a cavity in a substrate 41 with indices (100) with an etching mask oriented along <110>.
Figure 5:
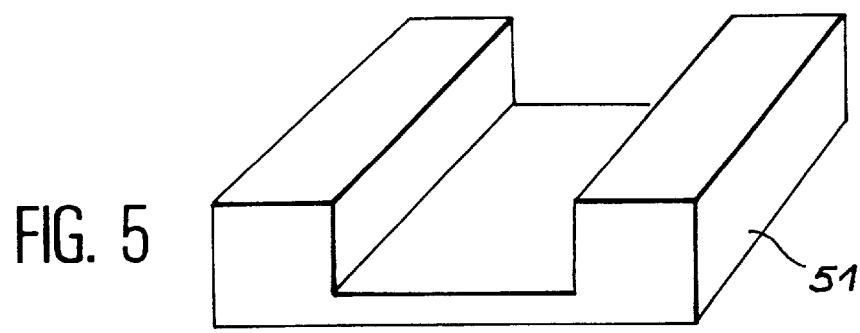
FIG. 5 shows the shape of a cavity etched in a substrate 51 with indices (110) with an etching mask oriented along <111>.

These structures are drawn and sized optimally taking account of the required mechanical constraints, and can be used as supports for detection elements or strain gauges. The advantage of the invention is due to the possibility of placing these detection elements along the required direction which will be chosen as a function of the deformation of the structure and for which the crystalline orientation and the doping type will also be optimized. These elements will be made in the thin film added on before anisotropic chemical etching of the silicon forming the support and whose orientation on the support will be chosen when the substrate is manufactured.

Advantageously, bonding of the thin film on the support may be reinforced by the use of a "wafer bonding" technique, providing a perfect interatomic bond. This step is made after the separation phase of the thin film of the silicate platelet by an appropriate heat treatment, usually 2 hours at about 1100° C. The fact of having a thin film is then better than using the standard "wafer bonding" technique which uses two thick silicon platelets. Due to the high temperature, high differential expansion stresses are transmitted if the crystallographic matching of the platelets is not perfect, because silicon has an anisotropic coefficient of expansion, in other words it is variable depending on the orientation and the direction. In the case of this invention, the thin film is glued onto its support during the third phase, in other words at a temperature of the order of 500° C., and due to its low thickness it may deform as a function of the expansion of the support during the high temperature annealing step, so that only a small fraction or none of the residual stresses are transferred after returning to ambient temperature.

The description will be continued by a specific example dealing with the manufacture of a pressure sensor for a hydrophone.

The use of a silicon substrate with orientation (100) is very attractive from the economic and technological points of view. This orientation is the most frequently used in microelectronics, and gives the minimum cost per platelet. Furthermore, the angles between the directions of low speed attack planes (111) at the surface of the substrate are 90° C., which is usually favorable for the description of mechanical structures. Therefore, structures made in this type of substrate will have geometries giving mechanical stresses preferentially oriented along <110> directions.

Referring to the piezoresistance coefficient, it may be observed that only p type doping is adapted to strains in these directions. This explains why up to now, only p type gauges were used on a (100) substrate. However, it may be useful to place n type strain gauges to improve the contact or the behavior at high temperature or the absolute value of the piezoresistance coefficient. In this case the preferred direction for maximizing the coefficient is <100>, in order words 45° from the <110> standard direction for a (100) substrate.

Therefore this invention has the remarkable advantage that it can produce a thin film of silicon with an arbitrary orientation on a substrate, and particularly by aligning the <100> direction of the thin film with the <110> direction of the substrate, both possessing a (100) crystalline orientation.

Figure 6:
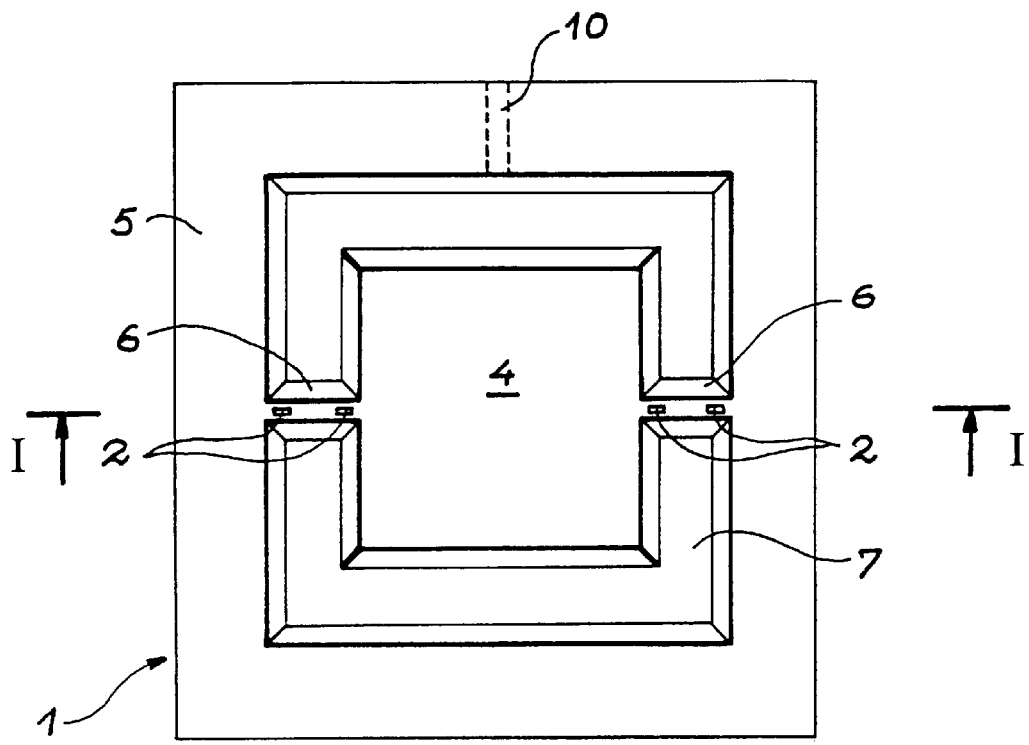
Figure 6:
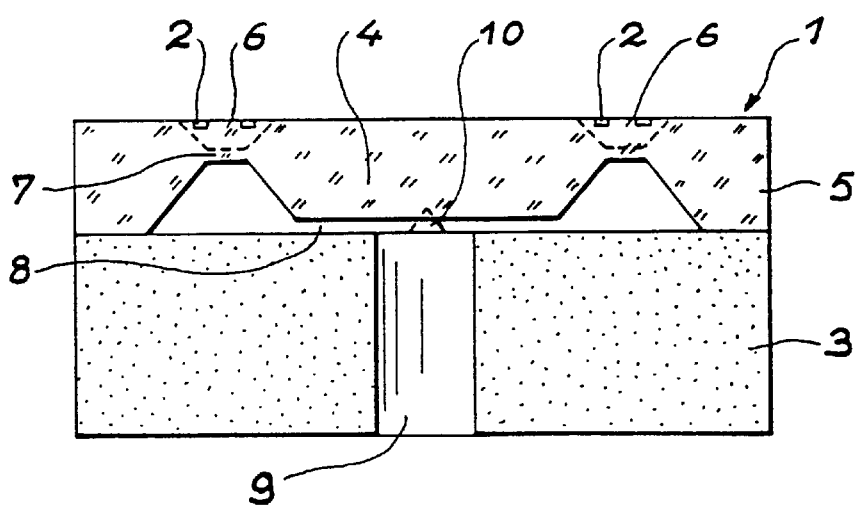

The hydrophone pressure sensor that can be made according to this invention is illustrated in FIGS. 6A and 6B. It is composed of three associated parts, namely a mechanical structure 1 made of a semiconducting material, used as a support for four strain gauges shown schematically in reference 2, structure 1 itself being mounted on a support 3. The mechanical structure 1 comprises a thick and practically undeformable central contact block 4 connected to a thick frame 5 by beams 6, of which there are two in this case but there could be more. The thickness and length of the beams are optimized as a function of the required application, by an expert in the field. The remaining surface between block 4 and frame 5 consists of a thin membrane 7, the only purpose of which is to seal the upper (or front) and lower (or back) surfaces of the sensor as they are shown in FIG. 6B. Beams 6 are made of a silicon substrate with a (100) orientation and are naturally oriented along the <110> direction. The lower surface of structure 1 has a central recess 8 to allow the correct movement of contact block 4. Support 3, for example made of Pyrex® type glass, is fixed to structure 1. It has a central hole 9 aligned on the contact block 4.

For a hydrophone application, the continuous component of the pressure has to be eliminated. This is done by including a link between the upper and lower surfaces of the structure 1. The geometry of this link defining the pressure loss during use, may be calculated by an expert in the field as a function of the fluid to be used to fill the hydrophone and the required characteristics and particularly the lower passband. For standard use the interesting low cutoff frequency is of the order of 1 Hz, which gives a channel 10 with an average width of about 50 $\mu$m for a length of 400 $\mu$m. It is very easy to obtain a triangular shape using anisotropic chemical etching of silicon, with good dimensional control (due to blocking of the attack when the slow attack planes meet.

Under the effect of a pressure difference between the two surfaces, structure 1 will deform through beams 6, the thick central contact block 4 remaining practically flat. Since beams 6 are rigidly built-in at their ends, the maximum induced stresses will therefore be located close to where the beams are built in. Strain gauges 2 are placed in these areas and are aligned parallel to the direction of the beam (<110> for the substrate), but they may have their own <100> direction if they are of the n type.

We will now describe the various steps in the process of manufacturing this type of sensors. They will be made collectively, although the following Figures only show the manufacture of a single sensor.

The process begins with the preparation of the structure 1 in accordance with the information in document FR-A-2 681 472. This is done by working on two substrates; a first substrate which will form the mechanical structure of the pressure sensor, and a second substrate which will contain the strain gauges.

Figure 7:
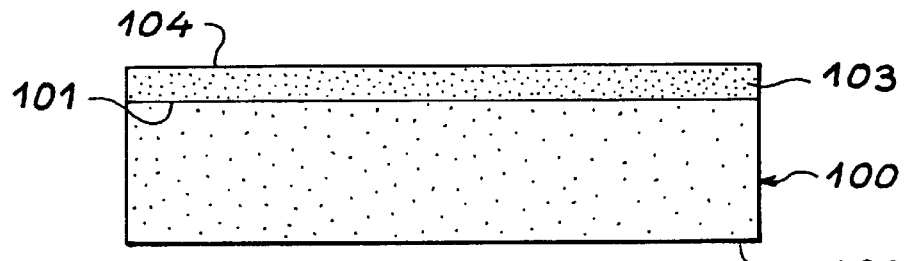

FIG. 7 illustrates the first substrate. This first substrate with reference 100 is a monocrystalline silicon with a (100) orientation. It has polished upper 101 and lower 102 surfaces and a given thickness, for example 450 $\mu$m. It is covered on its upper and/or lower surface by a layer of thermal oxide or other compound. Thus surface 101 is covered by a layer of $SiO_2$ oxide 103 obtained by deposit or oxide growth, with a thickness of about 0.5 $\mu$m and with one free surface 104.

Figure 8:
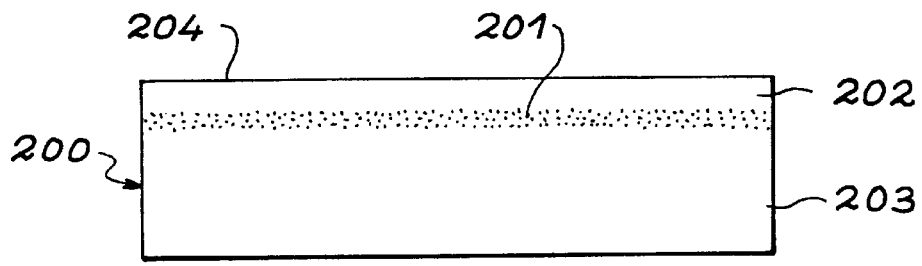

FIG. 8 shows the second substrate. This second substrate is marked with reference 200 and is made of monocrystalline silicon with orientation (100), and has been subjected to the first step (ionic implantation step) in the process described in document FR-A-2 681 472 and summarized above. The consequence of this ionic implantation step is a layer of gaseous micro-bubbles 201 delimiting a thin film 202 from the rest of the substrate 203 within the volume of substrate 200. The thickness of this thin film is about 0.2 $\mu$m.

After an appropriate treatment of surfaces 104 and 204 of substrates 100 and 200 for direct bonding, these surfaces are put into contact in accordance with the second step in the process described in document FR-A-2 681 472, taking care if n strain gauges are used to orient the <110> directions of the two substrates at an angle of 45°.

Figure 9:
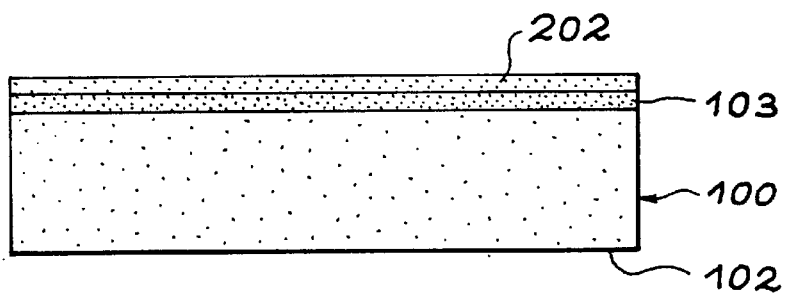

The third step in this process is to separate the thin film 202 from substrate 200, while gluing it on surface 104 of the oxide layer of substrate 100. When the rest 203 of the substrate 200 is removed, the structure shown in FIG. 9 is obtained. A complementary heat treatment of this structure for about 2 hours at 1100° C. will give a permanent bond between the thin film 202 and substrate 100 covered by its oxide layer 103. If necessary, this heat treatment may be followed by a polishing and n type doping operation (by ionic implantation or diffusion) of the silicon thin film. Heat treatment could modify the initial doping of the strain gauge.

FIGS. 10 to 14 show how the strain gauges are obtained. For clarity, the only part of the structure shown is that part containing the gauge located at the leftmost part of FIG. 6B.

Figure 10:
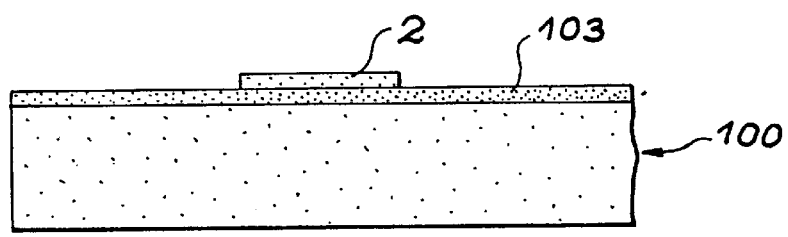
Figure 11:
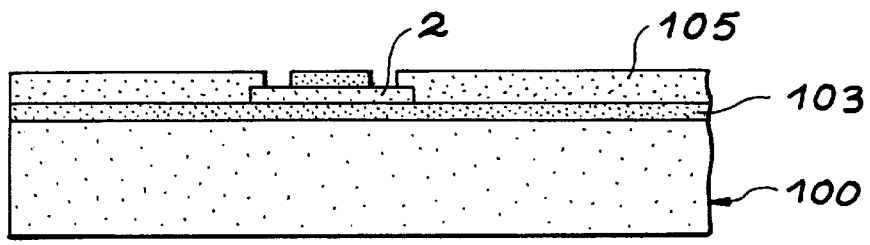
Figure 12:
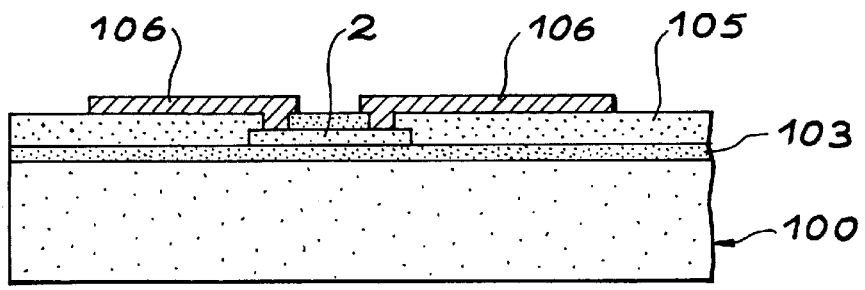
Figure 13:
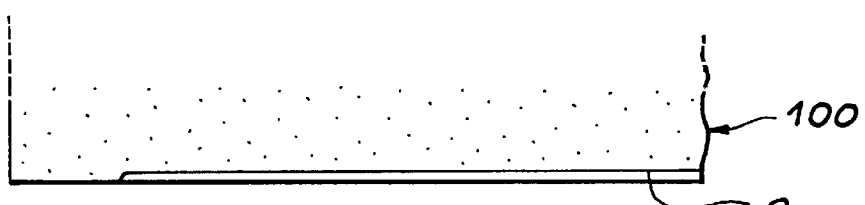

The strain gauges are etched in the silicon thin film (film 202 in FIG. 9) using conventional photolithographic techniques used in microelectronics. Four gauges are used to make a Wheatstone bridge. Depositing a photosensitive resin and then insulating it through a mask defining the desired geometry, followed by the etching of the silicon thin film (advantageously a reactive ionic etching using a gas containing fluorine, for example $SF_6$) can produce gauges at the required locations. FIG. 10 shows one of these gauges 2.

An approximately 0.3 $\mu$m thick passivation layer 105, for example made of $Sio_2$ or $Si_3N_4$, is then deposited on the substrate 100 on the strain gauges side using a plasma assisted gas decomposition technique (PECVD). Openings 106 are formed in layer 105 at the ends of gauges 2 to connect to contacts, still using photolithoengraving (see FIG. 11).

A suitable metallization is deposited and etched on layer 105 to interconnect the gauges in a bridge. A Ti/TiN/Al combination deposited by cathode sputtering may be used. The metallic layer may be etched by attack in appropriate chemical solutions. This thus gives electrical conductors 106 (see FIG. 12).

The surface 102 of substrate 100 is treated by photolithoengraving on a surface corresponding to membrane 7 and to the central stud 4 in order to form the recess 8. The etching may be a reactive ionic etching done over a depth of 2 to 3 $\mu$m (see FIG. 13).

Figure 14:
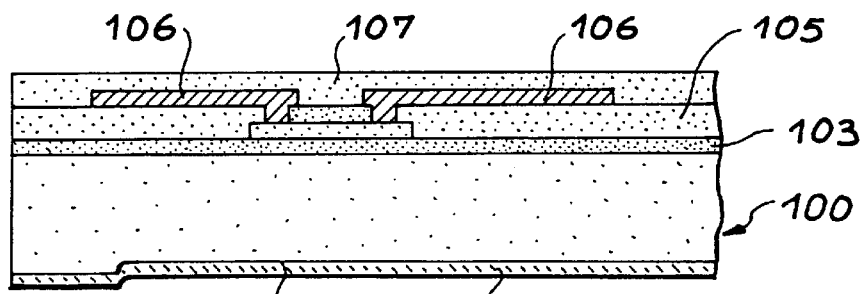

A protective layer 107, 108 is then deposited on each main face of the structure obtained (see FIG. 14). Layers 107 and 108 are advantageously made of $Si_3N_4$ and their thickness may be about 0.5 $\mu$m. A PECVD technique may be used for the deposit.

Figure 15:
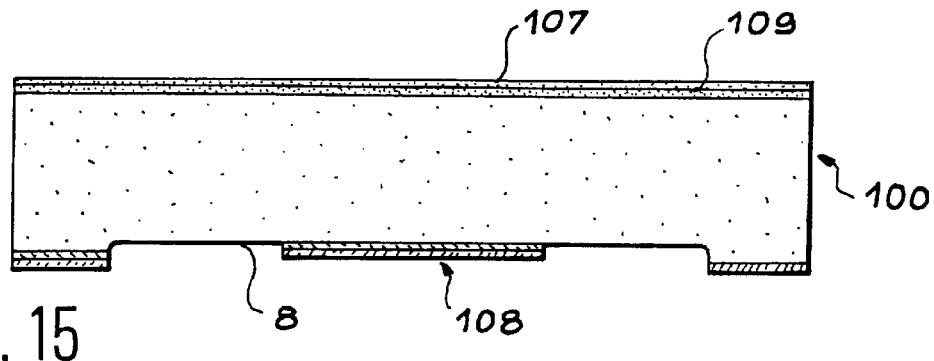

The protective layer 108 is then masked and etched in two steps over about half of its thickness using different geometries, by photolithoengraving. The result obtained is illustrated in FIG. 15 which shows the entire structure. For simplification reasons, all layers on the front surface of the structure referenced 103, 2, 105 and 106 in FIG. 14 and located under protective layer 107, have been shown as a single layer 109 without any details.

Figure 16:
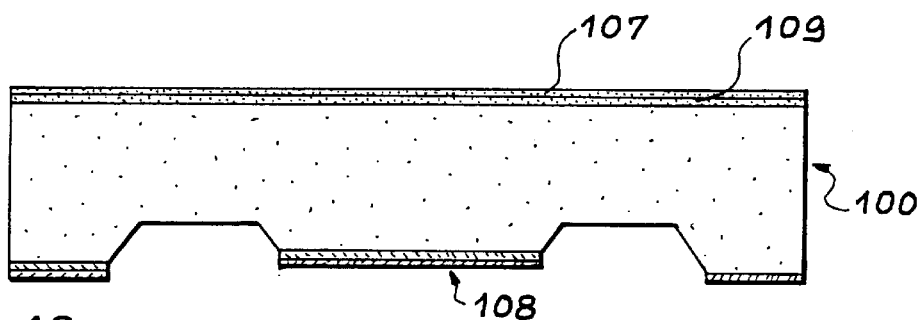

The back surface of the structure (side opposite the strain gauges) is then subject to a first anisotropic chemical etching of silicon stripped by etching of protective layer 108. This silicon etching may be done using a hot basic solution, for example a solution of KOH or tetramethylammoniumhydroxide (TMAH) at about 80° C. The etching depth is determined as a function of the required stiffness of the final structure. For example, for a beam with a final thickness of 150 $\mu$m and for a membrane thickness of 20 $\mu$m, the etching depth done during the first chemical etching of silicon may be 170 $\mu$m. The result obtained is shown in FIG. 16.

Figure 17:
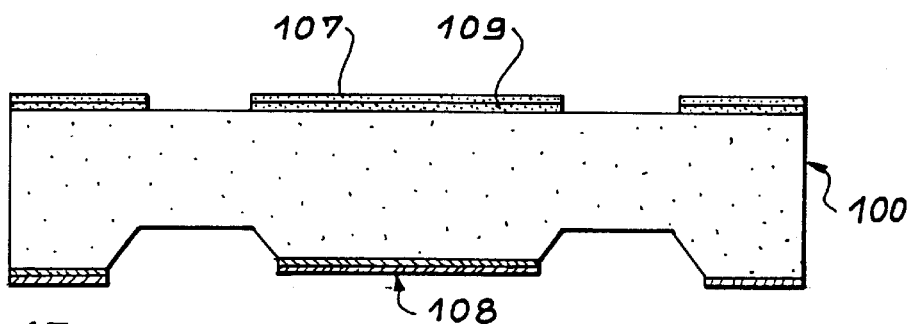

This is followed by photolithoengraving of the protective layer 107 covering the front of the structure, to define the geometry of the beam and the central contact block elements. It is followed by reactive ionic etching of the protective layer 107 and the assembly referenced 109 in unproducted locations. The result obtained is shown in FIG. 17.

Figure 18:
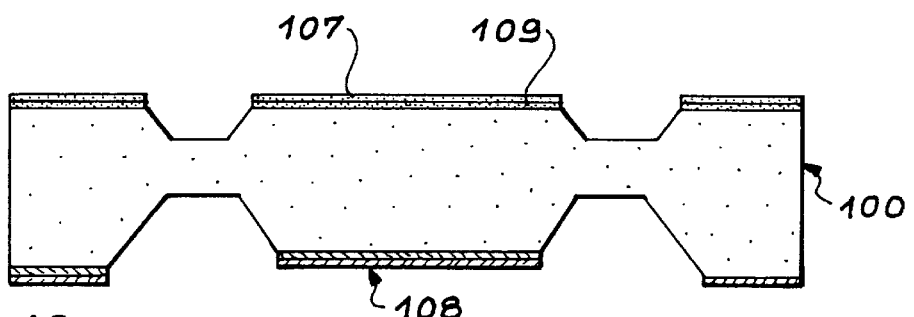

A second anisotropic chemical etching of silicon is then undertaken, this time with a two-sided attack, the thickness remaining to be etched starting from each side being 130 $\mu$m to obtain a membrane thickness of 20 $\mu$m. In anticipation of forming channel 10 (see FIGS. 6A and 6B), this second etching is stopped when a depth of 80 $\mu$m has been etched on each surface, if the design depth of the channel is 50 $\mu$m. The result obtained is shown in FIG. 18. This and subsequent Figures do not show the beams. The sectional view corresponding to these Figures was chosen to show etching of the front surface.

Figure 19:
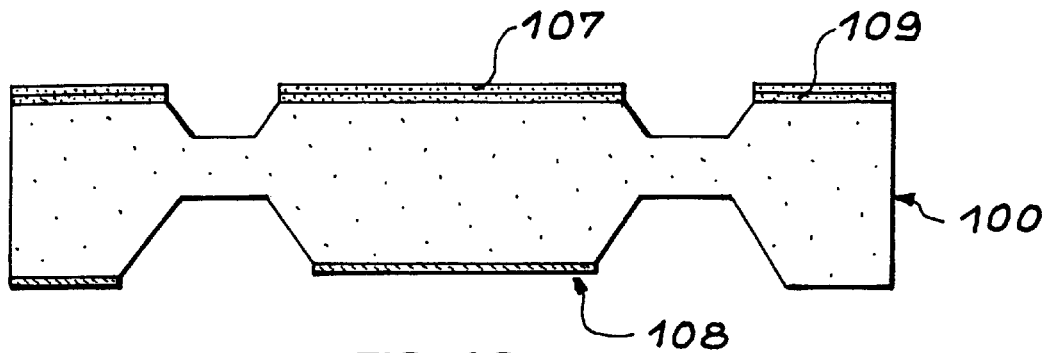

This channel is then defined on the back surface of the frame (reference 5 in FIGS. 6A and 6B) by etching the protective layer 108 which is partially already etched. This operation is done without masking by attacking the protective layer 108 on the back surface until the required zones disappear, in other words over about half the thickness of this layer. The result obtained is shown in FIG. 19.

Figure 20:
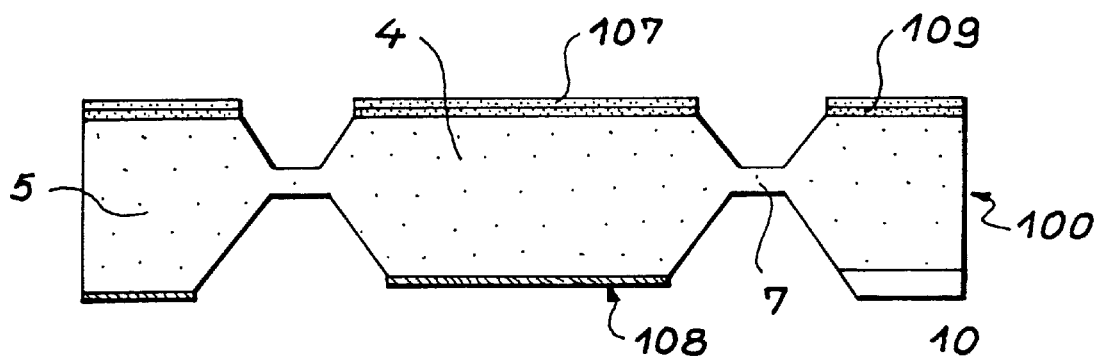

A third anisotropic etching of silicon is then carried out over a depth of 50 $\mu$m starting from each surface to give the result shown in FIG. 20. This therefore gives a mechanical structure made of silicon composed of a central contact block 4 with a thickness of about 450 $\mu$m, held on a frame 5 of the same thickness by 150 $\mu$m deep beams and a membrane 7 with a thickness of 20 $\mu$m. The result obtained is shown in FIG. 20, in which the beams cannot been seen.

Figure 21:
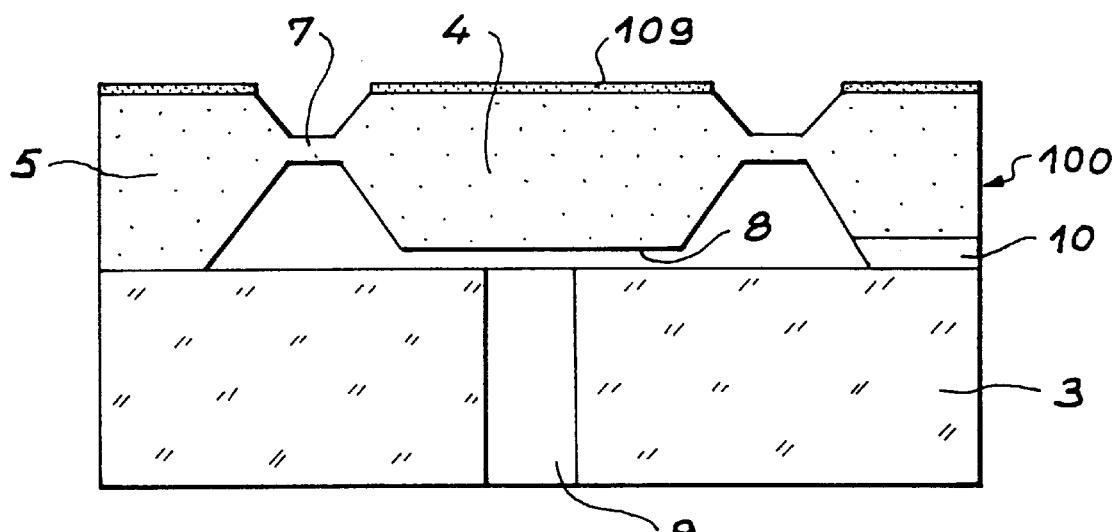

After the remaining parts of protective layers 107 and 108 have been removed by reactive ionic etching, the structure is bonded to support 3 drilled with hole 9, by aligning this hole with the central contact block 4. If the support 3 is made of Pyrex® type glass, bonding may be of the anodic type, in other words may be done at a temperature of about 400° C. in the presence of an electrical field, as described in the article "Field Assisted Glass-Metal Sealing" by G. Wallis and D.I Pomerants, published in the Journal of Applied Physics, vol. 40, No. 10, September 1969. The result obtained is shown in FIG. 21.

The final step consists of cutting the sensors individually, since they are manufactured collectively. Cutting is done at the channel to make the bond between the inside of the cavity (back surface) and the environment of the front surface. It produces the individual sensors containing structure 1 as a support for strain gauges.

We claim:

1. Process for manufacturing a strain gauge sensor using the piezoresistive effect, the sensor comprising a structure made of a semiconducting material suitable for being anisotropically etched to act as a support for at least one strain gauge also made of a semiconducting material, comprising the following operations:

etching, of a first substrate made of a semiconducting material with a given doping, along a crystallographic plane chosen to enhance said etclhing to form the said structure, manufacture of a strain gauge made of a senicondiucting material with a doping of either n conductivity type or p conductivity type and along a crystallographic plane chosen to enhance piezoresistivity, coefficiency, bonding the strain gauge onto the structure to obtain said sensor.

2. Process according to claim 1, in which the gauge is made from a second substrate made of a monocrystalline semiconducting material with a doping of either n conductivity type or p conductivity type and comprising a plane surface chosen as a function of the said crystallographic plane determined for the gauge, the plane surface being subjected to implantation of ions to an ion penetration depth creating a layer of gaseous micro-bubbles within the volume of the second substrate and at a depth similar to the ion penetration depth, the layer delimiting a thin film on a side of the plane surface, the ions being chosen among ions of rare gases or hydrogen gas, the temperature of the second substrate being kept above the temperature at which the gas generated by the implanted ions can escape from the second substrate by diffusion, then the structure and the second substrate are bonded, the plane surface of the second substrate being adjacent to a part of the structure acting as a support to the strain gauge, the second substrate is then subjected to a high enough temperature to create separation between the thin film and the rest of the second substrate due to a crystalline rearrangement effect and the pressure of the micro-bubbles, and finally the thin film is etched to a desired shape.

3. Process according to claim 2, in which the structure and the second substrate are bonded together by an adhesive substance.

4. Process according to claim 2, in which the structure and the second substrate are bonded together by thermal and/or electrostatic treatment to improve interatomic bonds between corresponding surfaces of the structure and the second substrate.

5. Process according to claim 1, and including the step of forming a dielectric layer on the first substrate and/or on the strain gauge prior to said bonding, this dielectric layer being designed to isolate the said structure of the strain gauge during, said bonding.

6. Process according to claim 1, in which the semiconducting material used to make a strain gauge and said support comprises monocrystalliine silicon.

7. Process according to claim 5, in which the semiconducting material used to make a strain gauge and its support comprises monocirystalline silicon, and in which the dielectric layer comprises silicon.

* * * * *

UNITED STATES PATENT AND TRADEMARK OFFICE
CERTIFICATE OF CORRECTION

PATENT NO. : 6,001,666
DATED : December 14, 1999
INVENTOR(S) : Diem et al.

It is certified that error appears in the above-identified patent and that said Letters Patent is hereby corrected as shown below:

Column 8,
Line 60, "etclhing" should be --semiconductor etching--.

Column 10,
Line 13, delete "," (comma).
Line 19, change "monocirystalline" to --monocrystalline--.

Signed and Sealed this

Nineteenth Day of June, 2001

Attest:

NICHOLAS P. GODICI
Attesting Officer  Acting Director of the United States Patent and Trademark Office

UNITED STATES PATENT AND TRADEMARK OFFICE
CERTIFICATE OF CORRECTION

PATENT NO. : 6,001,666
DATED : December 14, 1999
INVENTOR(S) : Diem et al.

It is certified that error appears in the above-identified patent and that said Letters Patent is hereby corrected as shown below:

Column 8,
Line 60, change "etclhing" to -- etching --.
Line 62, change "senicondiucting" to -- semiconducting --.

Signed and Sealed this

Twenty-second Day of October, 2002

Attest:

Attesting Officer

JAMES E. ROGAN
Director of the United States Patent and Trademark Office